US006174080B1

(12) United States Patent
Jennings

(10) Patent No.: US 6,174,080 B1
(45) Date of Patent: Jan. 16, 2001

(54) APPARATUS AND METHODS FOR MEASURING SUBSTRATE TEMPERATURE

(75) Inventor: Dean Jennings, San Ramon, CA (US)

(73) Assignee: Applied Materials, Inc., Santa Clara, CA (US)

(*) Notice: Under 35 U.S.C. 154(b), the term of this patent shall be extended for 0 days.

(21) Appl. No.: 09/130,304

(22) Filed: Aug. 6, 1998

(51) Int. Cl.[7] .................... G01J 5/58; G01J 5/00; A21B 1/00
(52) U.S. Cl. .................. 374/131; 374/130; 219/405
(58) Field of Search .................. 374/130, 131, 374/161, 120, 121; 219/405

(56) References Cited

U.S. PATENT DOCUMENTS

| 3,796,099 | 3/1974 | Shimotsuma et al. | 374/126 |
|---|---|---|---|
| 4,408,878 | 10/1983 | Fischbach | 356/43 |
| 4,611,930 | 9/1986 | Stein | 374/126 |
| 4,659,234 | 4/1987 | Brouwer et al. | 374/121 |
| 4,708,474 | 11/1987 | Suarez-Gonzalez | 356/45 |
| 4,881,823 | 11/1989 | Tanaka et al. | 374/126 |
| 4,919,542 | 4/1990 | Nulman et al. | 374/9 |
| 4,956,538 | 9/1990 | Moslehi | 219/121.6 |
| 4,979,134 | 12/1990 | Arima et al. | 702/135 |
| 5,011,295 | 4/1991 | Krishnan et al. | 374/126 |
| 5,029,117 | 7/1991 | Patton | 702/135 |
| 5,156,461 | 10/1992 | Moslehi et al. | 374/121 |
| 5,226,732 | 7/1993 | Nakos et al. | 374/133 |
| 5,326,171 | 7/1994 | Thompson et al. | 374/121 |
| 5,436,443 | 7/1995 | Abtahi | 250/225 |
| 5,660,472 | 8/1997 | Peuse et al. | 374/128 |
| 5,755,511 | 5/1998 | Peuse et al. | 374/128 |
| 5,823,681 | * 10/1998 | Cabib et al. | 374/131 |
| 5,830,277 | * 11/1998 | Johnsgard et al. | 374/130 |

FOREIGN PATENT DOCUMENTS

| 0 612 862 A1 | 8/1994 | (EP) . | |
|---|---|---|---|
| 2 228 566 | 8/1990 | (GB) . | |
| 0019730 | * 1/1990 | (JP) | 374/130 |
| 0256254 | * 10/1990 | (JP) | 374/130 |

OTHER PUBLICATIONS

Apte et al., "Rapid Thermal Processing Uniformity Using Multivariable Control of a Circularly Symmetric 3 Zone Lamp," *IEEE Transactions on Semiconductor Manufacturing*, 5, 180–188, Aug. 1992.
Deardorff, "Eliminaton of reflection errors in emissometers by using alternate apertures," *Rev. Sci. Instrum.*, vol. 37, No. 10:1279–1282, Oct. 1976.
Dilhac et al., "Temperature Control in a Rapid Thermal Processor," *IEEE Transactions on Electrons on Electron Devices*, 39, 201–203, Jan. 1992.

(List continued on next page.)

Primary Examiner—Christopher W. Fulton
Assistant Examiner—Stanley J. Pruchnic, Jr.
(74) Attorney, Agent, or Firm—Fish & Richardson

(57) ABSTRACT

An apparatus for measuring the temperature of a substrate in a thermal processing chamber is disclosed. The chamber includes a reflector forming a reflecting cavity with a substrate when the substrate is positioned in the chamber. The apparatus includes a first polarizer positioned to polarize radiation reflected by the reflector, a probe having an input end positioned to receive reflected and non-reflected radiation from the reflecting cavity, a polarizing system optically coupled to an output end of the probe, and a detector apparatus optically coupled to the polarizing system. The polarizing system is configured to generate a first beam and a second beam, and it includes a second polarizer oriented such that a ratio of reflected radiation to non-reflected radiation is higher in the first beam than the second beam. The detector apparatus generates a first intensity signal from the first beam and a second intensity signal from the second beam. The two intensity signals are processed to determine an emissivity-corrected substrate temperature.

26 Claims, 3 Drawing Sheets

OTHER PUBLICATIONS

Doering, "Microelectronics Manufacturing Science and Technology Program Extends Capabilites in Integrated Circuit Manufacturing," *Microelectronics Manufacturing Science & Technology*, 2–64, Sep. 1992.

Gouffe, *Revue D'optique 24*, translation, 1–10, 1945.

Gyurcsik, et al., "A Model for Rapid Thermal Processing: Achieving Uniformity Through Lamp Control," *IEEE Transactions on Semiconductor Manufacturing*, 4, 9–13, Feb. 1991.

Hernandez, et al., "Determination de L'emissivite a haute temperature a l'aide de systemes a fibres optiques equipes d'hemispheres reflecteurs," *J. Phys. III France*, 1575–1586, May 1991. (Translation).

Honda et al., "New Radiation Thermometry Using Multiple Reflection for Temperature Measurement of Steel Sheets," In Schooley, "Temperature, Its Measurement & Control in Science and Industry", *American Institute of Physics*, 923–927, (NY) 1992.

Norman, "Optimization of Transient Temperature Uniformity in RTP Systems," *IEEE Transactions on Electron Devices*, 205–207, Jan. 1992.

Pikashov et al., "Determining Emissivity and True Surface Temperature by Means of a Pyrometer and an Attachment," *Gas Institute, Kiev*, translated from Inzhenerno–Fizicheskii Zhurnal, 16, 723–730, Apr. 1969.

Roozeboom, "Manufacturing Equipment Issues in Rapid Thermal Processing," *Rapid Thermal Processing Science and Technology*, 389–423, 1993.

Roozeboom, "Rapid Thermal Processing: Status, Problems and Options After the First 25 years," Mat. Res. Soc. Symp. Proc., 303, 149–164, 1993.

Sorrell et al., "Temperature Uniformity in RTP Furances," *IEEE Transactions on Electron Devices*, 39, 75–80, Jan. 1992.

Roozeboom, "Rapid Thermal processing systems: A review with emphasis on temperature control", J. of Vacuum Science and Technology 8, vol. 8, No. 6, 1249–1259 (Nov. 1990).

* cited by examiner

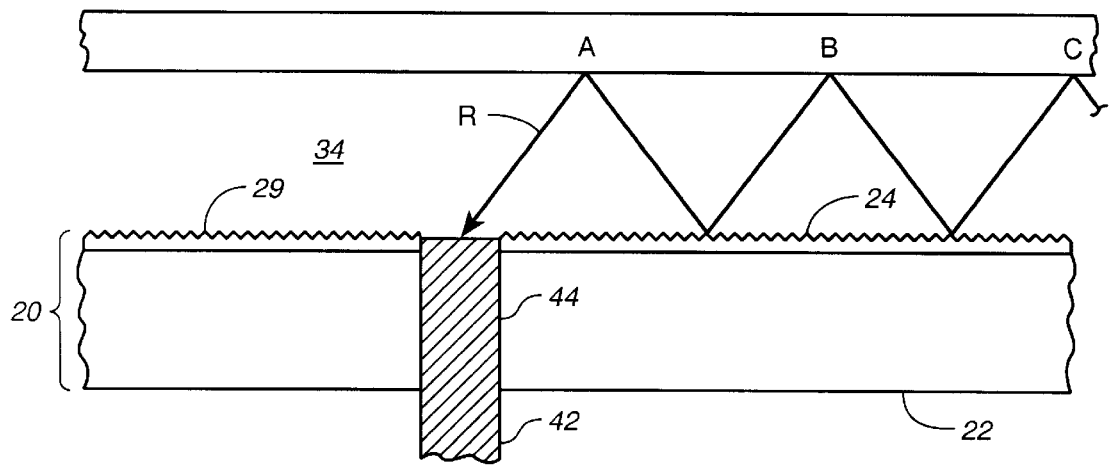
FIG._2
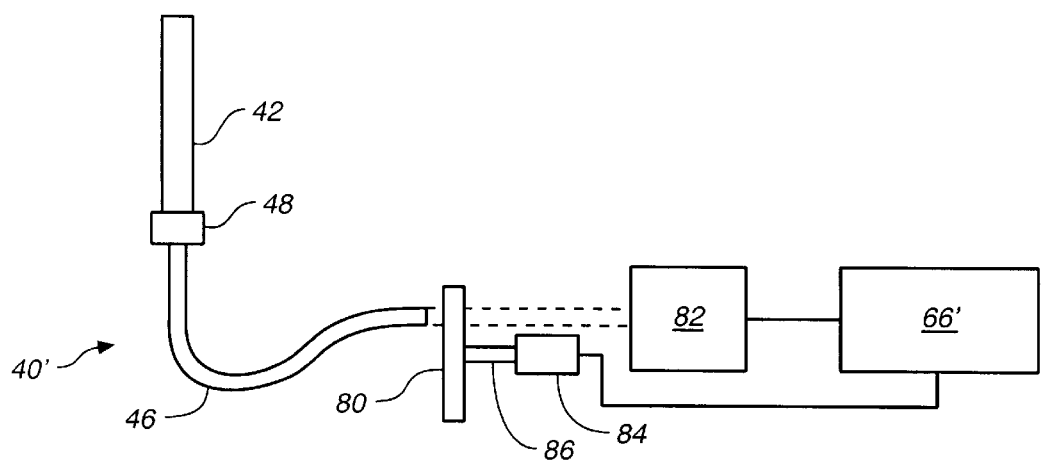
FIG._3

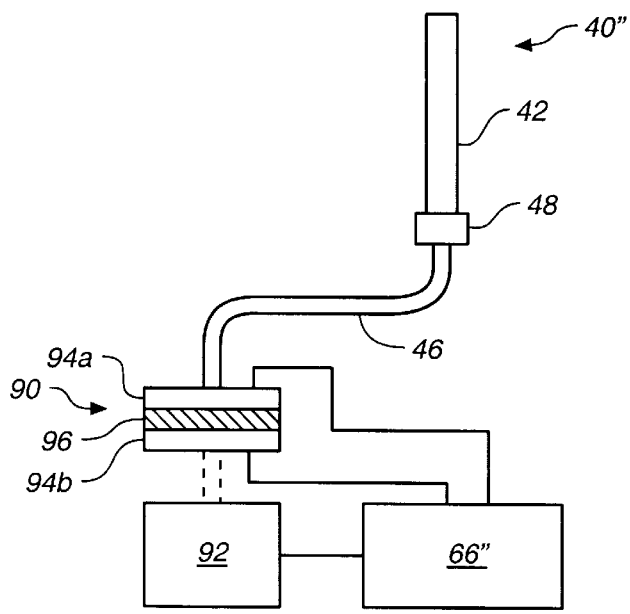
FIG._4
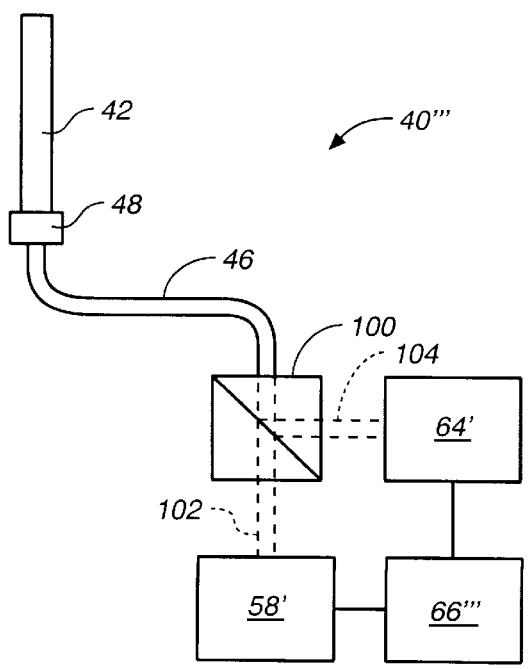
FIG._5
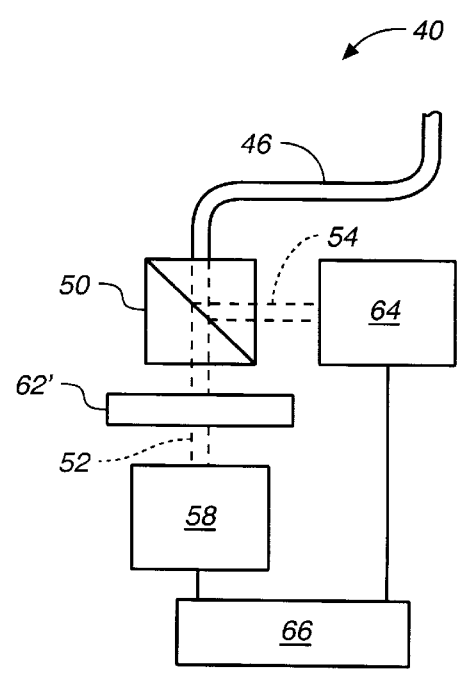
FIG._6

_US 6,174,080 B1_

APPARATUS AND METHODS FOR MEASURING SUBSTRATE TEMPERATURE

BACKGROUND

The present invention relates to apparatus and methods for measuring a substrate temperature during thermal processing using polarized radiation.

In rapid thermal processing (RTP), a substrate is heated quickly and uniformly to a high temperature, such as 400° Celsius (C) or more, to perform a fabrication step such as annealing, cleaning, chemical vapor deposition, oxidation, or nitration. For example, a thermal processing system, such as the RTP tool available from Applied Materials, Inc., under the trade name "Centura$^R$", may be used to perform metal annealing at temperatures of 400° C. to 500° C., titanium silicide formation at temperatures around 650° C., or oxidation or implant annealing at temperatures around 1000° C.

The substrate temperature must be precisely controlled during these thermal processing steps to obtain high yields and process reliability, particularly given the submicron dimension of current semiconductor devices. For example, to fabricate a dielectric layer 60–80 angstroms (Å) thick with a uniformity of +/−2 Å, a typical requirement in current device structures, the temperature in successive processing runs cannot vary by more than a few °C. from the target temperature. To achieve this level of temperature control, the temperature of the substrate is measured in real time and in situ.

Optical pyrometry is a technology that is used to measure substrate temperatures in RTP systems. Pyrometry exploits a general property of objects, namely, that objects emit radiation with a particular spectral content and intensity that is characteristic of their temperature. Thus, by measuring the emitted radiation, the object's temperature can be determined. A pyrometer measures the emitted radiation intensity and performs the appropriate conversion to obtain the substrate temperature. The relationship between spectral intensity and temperature depends on the spectral emissivity of the substrate and the ideal blackbody intensity-temperature relationship, given by Planck's law:

$$I_b(\lambda, T) = \frac{2C_1}{\lambda^5 \left(e^{\frac{C_2}{\lambda T}} - 1\right)} \quad (1)$$

where $C_1$ and $C_2$ are known constants, $\lambda$ is the radiation wavelength of interest, and T is the substrate temperature measured in °K. The spectral emissivity $\epsilon(\lambda,T)$ of an object is the ratio of its emitted spectral intensity $I(\lambda,T)$ to that of a black body at the same temperature $I_b(\lambda,T)$. That is, $$\epsilon(\lambda, T) = \frac{I(\lambda, T)}{I_b(\lambda, T)} \quad (2)$$

Since $C_1$ and $C_2$ are known constants, under ideal conditions, the temperature of the substrate can be accurately determined if $\epsilon(\lambda,T)$ is known.

The emissivity of a substrate depends on many factors, including the characteristics of the wafer itself (e.g., temperature, surface roughness, doping level of various impurities, material composition and thickness of surface layers), the characteristics of the process chamber, and the process history of the wafer. Therefore, a priori estimation of substrate emissivity cannot provide a general purpose pyrometric temperature measurement capability. Consequently, it is necessary to measure the emissivity of the substrate in situ. Furthermore, any uncertainty in the measured emissivity introduces an uncertainty into the temperature measurement.

To reduce this uncertainty, several techniques have been developed for reducing the effect of substrate emissivity on the temperature measurement. One such technique involves placing a reflector plate beneath the back surface of a substrate to form a reflecting cavity. If the reflector plate was an ideal reflector, the reflecting cavity would act as an ideal black body. That is, the intensity of the radiation within the reflecting cavity would not be a function of the emissivity of the surface of the substrate. Thus, in the ideal case, the reflecting cavity increases the effective emissivity of the substrate to a value equal to one.

However, because the reflector plate is not an ideal reflector, the effective emissivity of the substrate will be less than one, although it will be higher than the substrate's actual emissivity. Consequently, although variations in the actual emissivity of the substrate will have less impact on the measured temperature, there will still be uncertainties in the temperature measurements.

Furthermore, different regions of the substrate may have different emissivities. Consequently, if the emissivity of the substrate is measured in only one region, there will be uncertainty in the temperature measurements of other regions of the substrate.

SUMMARY

In one aspect, the invention is directed to an apparatus for measuring the temperature of a substrate in a thermal processing chamber, where the chamber includes a reflector forming a reflecting cavity with a substrate when the substrate is positioned in the chamber. The apparatus includes a first polarizer positioned to polarize radiation reflected by the reflector, a probe having an input end positioned to receive reflected and non-reflected radiation from the reflecting cavity, a polarizing system optically coupled to an output end of the probe, and a detector apparatus optically coupled to the polarizing system. The polarizing system is configured to generate a first beam and a second beam, and it includes a second polarizer oriented such that a ratio of reflected radiation to non-reflected radiation is higher in the first beam than the second beam. The detector apparatus generates a first intensity signal from the first beam and a second intensity signal from the second beam.

Implementations of the invention may include the following. A processor may be coupled to the detector apparatus to calculate a substrate temperature from the first and second intensity signals. The first polarizer may be located on a surface of the reflector. For example, the first polarizer may be a polarizing grating, such as a ruled or holographic grating. The first polarizer may polarize the radiation reflected from by the reflector with a first axis of polarization. The second polarizer may be configured to exclude radiation from the second beam having an axis of polarization parallel or perpendicular to the first axis of polarization.

The polarizing system may include a partially reflective surface positioned in an optical path of radiation exiting the output end of the probe to split that radiation into the first and second beams. A polarizing filter may be positioned in an optical path of the first beam and oriented be to block radiation having an axis of polarization orthogonal to the first axis of polarization, and a polarizing filter may be positioned in an optical path of the second beam and be oriented to block radiation having an axis of polarization parallel to the first axis of polarization. A polarizing beam splitter may be positioned to split the radiation exiting the output end of the probe into the first and second beams. The second polarizer may include a polarizing filter movable between a first position in which the polarizing filter blocks radiation having an axis of polarization orthogonal to the first axis of polarization to form the first beam and a second position in which the polarizing filter blocks radiation having an axis of polarization parallel to the first axis of polarization to form the second beam. The second polarizer may include an electro-optic polarizing filter switchable between a first state in which the polarizing filter blocks radiation having an axis of polarization that is orthogonal to the first axis of polarization to form the first beam and a second state in which the polarizing filter transmits radiation having an axis of polarization that is orthogonal to the first axis of polarization to form the second beam. Alternately, the electo-optic polarizing filter may transmit radiation having an axis of polarization that is parallel to the first axis of polarization in the first state, and block radiation having an axis of polarization that is parallel to the first axis of polarization in the second state. The detector apparatus may include a first detector positioned in an optical path of the first beam to generate the first intensity signal and a second detector positioned in an optical path of the second beam to generate the second intensity signal.

In another aspect, the invention is directed to an apparatus for measuring the temperature of a substrate in a thermal processing chamber in which a reflector forms a reflecting cavity with a substrate when the substrate is positioned in the chamber. The apparatus includes a probe having an input end positioned to receive reflected and non-reflected radiation from the reflecting cavity, a detector optically coupled to an output end of the probe to generate first and second intensity signals, and an optical system positioned in an optical path between the probe and the detector. The optical system may be operable in first and second configurations, wherein a ratio of reflected radiation to non-reflected radiation impinging the detector is higher in the first configuration than in the second configuration.

In another aspect, the invention is directed to a method of measuring the temperature of a substrate in a thermal processing chamber. In the method, a substrate is positioned in a thermal processing chamber to form a reflecting cavity with a reflector located in the chamber. Radiation reflected by the reflector is polarized with a first polarizer, and radiation is sampled from the cavity with a probe. The sampled radiation is directed through a polarizing system to generate a first beam and a second beam. The polarizing system includes a second polarizer oriented so that a ratio of reflected radiation to non-reflected radiation is higher in the first beam than in the second beam. A first intensity signal is generated for the first beam, a second intensity signal is generated for the second beam, and a substrate temperature is determined from the first and second intensity signals.

In another aspect, the invention is directed to a method of measuring the temperature of a substrate in a thermal processing chamber. In the method, a substrate is positioned in a thermal processing chamber to form a reflecting cavity with a reflector located in the chamber. Radiation is sampled from the cavity with a probe, and a first intensity signal is generated for the sampled radiation with a detector. The ratio of reflected radiation to non-reflected radiation in the radiation impinging the detector is modified, and a second intensity signal is generated for the sampled radiation with the detector. A substrate temperature is determined from the first and second intensity signals.

Advantages of the invention may include the following. The emissivity of the substrate may be measured at multiple locations, thus reducing the uncertainty in the temperature measurements. Furthermore, the emissivity measurements may be made without introducing additional probes into the processing chamber.

Other features and advantages of the invention will become apparent from the following description, including the drawings and the claims.

BRIEF DESCRIPTION OF THE DRAWINGS

FIG. 2 is a schematic diagram of a virtual black body cavity showing ray-traces of light rays entering the probe of a temperature sensor.

FIG. 3 is a schematic view of a temperature sensor that includes a rotating polarized filter.

FIG. 4 is a schematic view of a temperature sensor that includes an electro-optical filter.

FIG. 5 is a schematic view of a temperature sensor that includes a polarizing beam splitter.

FIG. 6 is a schematic view of a temperature sensor that includes a polarizer positioned in the path of a transmitted beam.

DETAILED DESCRIPTION

Figure 1:
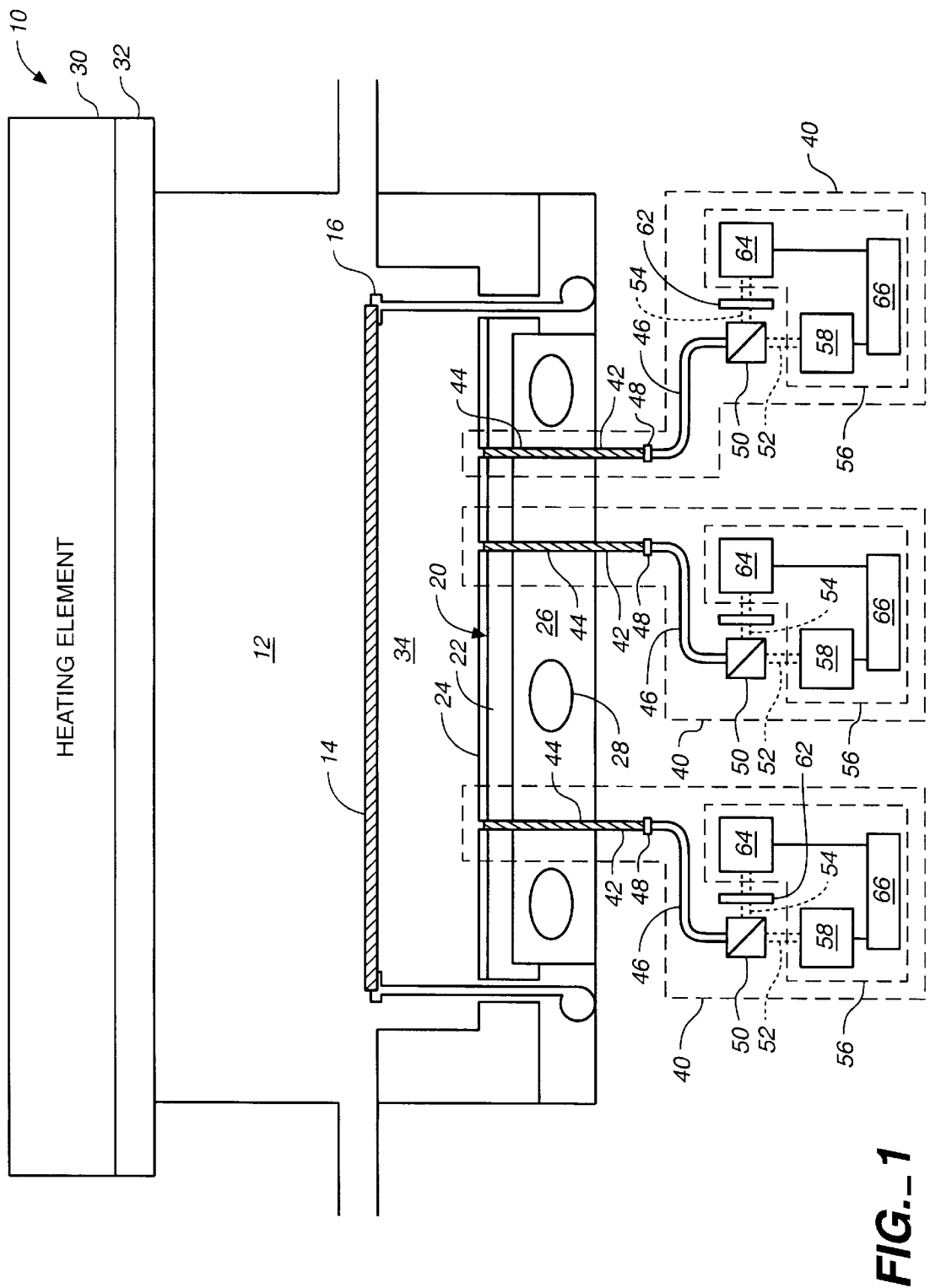
FIG. 1 is a schematic cross-sectional view of a rapid thermal processing system.

In the following description, the term "substrate" broadly covers any object that is being processed in a thermal processing chamber. The term "substrate" includes, for example, semiconductor wafers, flat panel displays, glass plates or disks, and plastic workpieces.

Referring to FIG. 1, an RTP system 10 includes a processing chamber 12 for processing, for example, an eight inch (200 mm) or twelve inch (300 mm) diameter disk-shaped substrate 14. A description of such an RTP system may be found in U.S. Pat. No. 5,660,472, the entire disclosure of which is incorporated herein by reference.

Substrate 14 is rapidly and evenly heated inside chamber 12 to an elevated temperature (e.g., between about 400 and 1000° C.) and may be subjected to various processing steps such as annealing, cleaning, chemical vapor deposition, etching, oxidation, or nitration. Substrate 14 is supported by a rotating support ring 16 above a reflector 20 that is mounted on a base 26. A coolant circulates through passages 28 in base 26 to control the temperature of the base and the reflector. The base may be made of stainless steel.

The reflector 20 may include an aluminum body 22 coated with a highly reflective layer 24, such as gold or rhodium. Gold has a reflectivity of about 0.975 in the infrared wavelength range of interest, i.e., about 900–1000 nm. To further enhance the reflectivity of the reflector, a quarter-wave stack may be formed on the gold layer.

The surface of reflector 20 is contoured to form a polarizing grating 29 (see also FIG. 2), such as a ruled or holographic grating. Such a grating causes the radiation reflected from the reflector to be polarized with an axis of polarization parallel to the grooves of the grating. The line density of the grating may be selected to maximize polarization of the wavelength range of interest. For example, the line density may be about 500 to 1500 lines/millimeter, e.g., about 1200 lines/millimeter for infrared radiation having wavelengths of about 900–1000 nm.

Substrate 14 is heated by a heating element 30 (e.g., a water-cooled array of tungsten-halogen lamps). Radiant energy from heating element 30 passes through a window 32, located directly above the substrate, to rapidly and uniformly heat the substrate to an elevated temperature. The heating element and window may be constructed as described in U.S. Pat. No. 5,155,336, the entire disclosure of which is incorporated herein by reference. The underside of substrate 14 and the top of reflector 20 form a reflecting cavity 34 which makes the substrate appear more like an ideal black body. That is, the reflector increases the effective emissivity of the substrate.

A plurality of temperature sensors or pyrometers 40 (e.g., eight, although only three are shown in FIG. 1) are positioned to measure the substrate's temperature at different substrate radii during the processing operation. Each temperature sensor 40 includes a probe 42 to sample radiation from cavity 34, a polarizing system or polarizer 62 to polarize a portion of the sampled radiation, and a detector apparatus 56 to measure the intensity of the sampled radiation and convert the intensity into a temperature measurement.

Referring to FIG. 2, the radiation entering probe 42 is made up of many components, including components emitted directly from the substrate and reflected components. For example, the radiation indicated by ray R includes one component emitted directly from the substrate (from point A) which has experienced no reflections; a second component (from point B and reflected at point A) which has experienced only one reflection off reflector 20 and the backside of substrate 14; a third component (from point C and reflected at points A and B) which has experienced two reflections off reflector 20 and the backside of substrate 14; etc. Thus, the total intensity $I_T$ of radiation sampled by probe 42 can be found by summing over an infinite series of components of impinging radiation as follows:

$$I_T = \epsilon_S \cdot I_b \cdot \sum_n R^n \cdot (1 - \epsilon_S)^n \qquad (3)$$

which reduces to $$I_T = \frac{\epsilon_S \cdot I_b}{1 - R(1 - \epsilon_S)} \qquad (4)$$

where R is the reflectivity of the reflector, $\epsilon_S$ is the emissivity of the substrate, and $I_b$ represents the radiation from an ideal blackbody at the wavelength range of interest.

The intensity, $I_D$, of the radiation emitted directly by the substrate, i.e., not including any reflected components, would be given by the following equation:

$$I_D = \epsilon_S I_b \qquad (5)$$

In contrast, reflector 20 increases the effective emissivity, $\epsilon_A$, of the substrate so that $$I_T = \epsilon_A I_b \qquad (6)$$

where $$\epsilon_A = \frac{\epsilon_S}{1 - R(1 - \epsilon_S)} \qquad (7)$$

and $I_b$ and $\epsilon_S$ have the meanings given for Equation (5).

As will be described in greater detail below, the temperature sensor makes two intensity measurements. The polarizer is configured so that the first intensity measurement uses proportionally more radiation that was reflected by polarizing grating 29 than the second measurement. That is, the ratio of reflected to non-reflected radiation is higher in the portion of the radiation used for the first intensity measurement than in the portion of the radiation used for the second intensity measurement. Consequently, the effective emissivity of the substrate in the second intensity measurement is closer to the actual emissivity $\epsilon_S$ of the substrate than the effective emissivity of the substrate in the first intensity measurement. As will be discussed below, the detector apparatus can use the difference in effective emissivities to compensate for the effect of emissivity on the substrate temperature measurement.

The probe 42 may be a light pipe which extends through a conduit 44 from the backside of base 26 and into an aperture in reflector 20. The light pipe may be a sapphire or quartz tube about 0.05 to 0.125 inches in diameter. One end of light pipe is located near (e.g., flush with) the top of reflector 20 to sample radiation from reflecting cavity 34. The other end of the light pipe is optically coupled to (e.g., held in close contact with) a flexible fiber optic guide 46. Fiber optic guide 46 and light pipe 42 may be coupled by a threaded connector 48.

Sampled radiation passes down light pipe 42, through fiber optic guide 46, and through an optical splitter, such as a split optical fiber or a partially reflective and partially transmissive (on occasion referred to as "partially reflective") surface 50, e.g., a partially silvered mirror. The light transmitted by surface 50 forms a transmitted beam 52 which is directed, e.g., by means of a second fiber optic guide (not shown), to a first detector 58. Similarly, the radiation reflected by surface 50 forms a reflected beam 54 which is directed, e.g., with a third fiber optic guide (not shown), through a polarizer or polarizing filter 62 and to a second detector 64. The intensity measurements from the two detectors are converted into a temperature measurement by pyrometer electronics 66.

The polarizer may be configured so that the radiation that is polarized by polarizing grating 29 enters one detector but is excluded from another detector. Specifically, the axis of polarization of polarizing filter 62 may be orthogonal to the polarization axis of the radiation reflected by polarizing grating 29. Consequently, assuming that the radiation reflected from the reflector is not spontaneously polarized when it reflects from the backside of the substrate, polarizing filter 62 will block the radiation reflected from the reflector plate. Thus, the radiation entering second detector 64 will contain only radiation emitted directly from the substrate which has experienced no reflections. In contrast, the radiation entering first detector 58 will contain both non-reflected and reflected radiation components. It may be noted that the reflector can be contoured with a polarizing grating only in regions surrounding the probes 42 to achieve this effect.

The pyrometer electronics 66 may be a programmable digital computer which computes the temperature of substrate 14 from the measured intensities. Each detector may be an optical pyrometer, available from Sekidenko of Portland, Oregon, and may have a narrow bandwidth, e.g., about 40 nanometers (nm), located at about 950 nm. The temperature reading from pyrometer electronics 66 may be used by a controller (not shown) to dynamically control the power to heating element 30 to correct for any deviations from a predefined temperature cycle.

Since first detector 58 receives both the reflected and non-reflected components of the radiation from cavity 34, the intensity measured by the first detector, $I_1$, may be given by the following equation:

$$I_1 = k_1(I_D + I_R) = k_1 I_T \quad I_T = \frac{I_1}{k_1} \quad (8)$$

where $I_R$ represents the intensity of the reflected radiation, $I_D$ represents the intensity of the non-reflected radiation, and $k_1$ is a calibration coefficient which represents the intensity losses in the optical path between the probe and first detector 58. Combining Equations (6) and (8), the intensity $I_1$ is given by the following equation:

$$I_1 = k_1 \epsilon_A I_b \quad (9)$$

where $I_b$ represents the radiation from an ideal blackbody at the wavelength range of interest and $\epsilon_A$ represents the apparent emissivity of the substrate. In short, the intensity measurement by first detector 58 is proportional to the apparent emissivity of the substrate.

In contrast, since polarizing filter 62 excludes the radiation reflected from reflector 20, the intensity measurement $I_2$ made by second detector 64 includes only radiation emitted directly by the substrate, i.e., the non-reflected radiation. However, assuming that the radiation emitted by the substrate is randomly polarized, the polarizing filter will block half of the non-reflected radiation. Thus, the intensity measurement, $I_2$, is given by the following equation:

$$I_2 = k_2 \frac{1}{2} I_D \quad I_D = 2 \frac{I_2}{k_2} \quad (10)$$

where $I_D$ represents the intensity of the non-reflected radiation, and $k_2$ is a calibration coefficient which represents the intensity loss in the optical path between the probe and second detector 64. Combining Equations (5) and (10), the intensity $I_2$ may be given by the following equation:

$$I_2 = k_2 \frac{1}{2} \epsilon_S I_b \quad (11)$$

where $I_b$ represents the radiation from an ideal blackbody in the wavelength range of interest and $\epsilon_S$ represents the actual emissivity of the substrate. Thus, the intensity measured by the second detector is proportional to the true emissivity of the substrate.

It should be noted that the polarizing filter could be positioned in the optical path of the transmitted beam rather than the reflected beam. In this case, the functions of the two detectors would be switched, so that the first detector would generate the second intensity signal $I_2$ and the second detector would generate the first intensity signal $I_1$.

The values of $k_1$ and $k_2$ may be determined during a calibration step in which a substrate having a known emissivity is inserted into the chamber and raised to a known temperature. The expected intensities may then be compared to the measured intensities to provide the calibration coefficients $k_1$ and $k_2$.

Solving for Equations 5–7 above, the intensity $I_b$ is given by the following equation:

$$I_b = \frac{R I_D I_T}{I_D - (1 - R) I_T} \quad (12)$$

In operation, first and second detectors 58 and 64 make intensity measurements $I_1$ and $I_2$, respectively. The pyrometer electronics 66 may solve Equations (8) and (10) to determine the intensities of $I_D$ and $I_T$, and then determine $I_b$ from Equation (12). Finally, the pyrometer electronics calculate the substrate temperature T from the ideal blackbody intensity-temperature relationship given by Equation (1).

Alternatively, the pyrometer electronics can calculate the substrate temperature using various approximations. For example, the pyrometer electronics may perform the temperature calculation described in aforementioned U.S. Pat. No. 5,660,472.

By solving Equations (8) and (10) in the calculation of the substrate temperature, the effect of substrate emissivity on the radiation intensity is accounted for, thereby providing a more accurate temperature measurement. In addition, since each temperature sensor corrects for the local substrate emissivity, uncertainty in the temperature measurement created by variations in the emissivity across the substrate is reduced. Furthermore, only one probe is required for each emissivity-corrected temperature measurement. This limits the number of apertures in the reflector, thereby reducing the cost and improving the effective reflectivity of the reflector.

Referring to FIG. 6, in another embodiment, polarizing filter 62' could be positioned in the optical path of the transmitted beam and be oriented such that its polarization axis is parallel to the polarization axis of the radiation reflected by polarizing grating 29. Consequently, the polarizing filter would transmit all of the radiation reflected from the reflector plate, but block half of the non-reflected radiation (the radiation emitted from the substrate being randomly polarized). In contrast, the radiation entering the second detector would contain the normal amount of both non-reflected and reflected radiation. Thus, more non-reflected radiation would impinge second detector 64 than first detector 58. Therefore, the ratio of reflected to non-reflected radiation would be higher in the first beam (the first detector) than the second beam (the second detector).

The first and second detectors would make intensity measurements $I_1$ and $I_2$, and the pyrometer electronics would calculate the intensities $I_D$ and $I_T$ from the following equations:

$$I_D = 2\left(\frac{I_2}{k_2} - \frac{I_1}{k_1}\right) \quad I_T = \frac{I_2}{k_2} \quad (13)$$

Then the pyrometer electronics would calculate black-body radiation $I_b$ from Equation (12), and determine the substrate temperature. The polarizing filter could be positioned in the optical path of the reflected beam rather than the transmitted beam, in which case the first detector would generate the second intensity signal $I_2$ and the second detector would generate the first intensity signal $I_1$.

Referring to FIG. 3, in another embodiment, temperature sensor 40' includes a single detector 82 and a rotating polarizer 80. The polarizer 80 may be rotated by a drive motor 84 which is connected to the polarizer by a draft shaft 86. The detector 82 makes a first intensity measurement $I_1$ when the polarization axis of the polarizer is parallel to the axis of polarization of the radiation reflected by the polarizing grating, and a second intensity measurement $I_2$ when the polarization axis of the polarizer is orthogonal to the axis of polarization of the radiation reflected by the polarizing grating. Thus, the first intensity measurement includes both the reflected and non-reflected components of the radiation, whereas the second intensity measurement includes only non-reflected components of the radiation. However, since the radiation emitted from the substrate is randomly polarized, one half of the direct radiation will be blocked by polarizer 80 and will not reach detector 82. Thus, the intensity measurements $I_1$ and $I_2$ are given by the following equations:

$$I_1 = k_1\left(I_R + \frac{1}{2}I_D\right) \quad (14)$$

and $$I_2 = k_2\left(\frac{1}{2}I_D\right) \quad (15)$$

where $I_R$ is the intensity of the reflected radiation from cavity 34, and $I_D$ is the intensity of the non-reflected radiation. Solving Equations (14) and (15), the total and direct intensities $I_T$ and $I_D$ are given by the following equations:

$$I_T = \frac{I_1}{k_1} + 2\frac{I_2}{k_2} \quad (16)$$

and $$I_D = 2\frac{I_2}{k_2} \quad (17)$$

After the intensities $I_T$ and $I_D$ have been calculated from Equations (16) and (17), the substrate temperature may be calculated using Equations (12) and (1). The pyrometer electronics 66' may be connected to an optical encoder which measures the rotation of drive shaft 86 in order to properly time intensity measurements $I_1$ and $I_2$.

Referring to FIG. 4, in another embodiment, temperature sensor 40'' includes an electro-optic polarizer or polarizing filter 90 and a detector 92. The electro-optic filter 90 can be a liquid crystal cell of conventional construction, including a layer of liquid crystal material 96 sandwiched between two transparent electrodes 94a and 94b. Pyrometer electronics 66'' may be connected to electrodes 94a and 94b to apply a voltage across liquid crystal layer 96 to switch the electro-optic filter between a first state, in which the filter blocks the radiation reflected by polarizing grating 29, and a second state, in which the filter transmits the radiation reflected by the grating. The detector 92 makes a first intensity measurement $I_1$ when the filter is in the first state, and a second intensity measurement $I_2$ when the filter is in the second state.

In the second state, electro-optic filter 90 may either transmit or block radiation with an axis of polarization orthogonal to the axis of polarization of the radiation reflected by the polarizing grating. If the filter transmits this radiation, then the substrate temperature may be calculated using Equations (8), (10) and (12). If the filter blocks this radiation, then the substrate temperature may be calculated using Equations (16), (17) and (12).

In another implementation, the electro-optic filter could block radiation having an axis of polarization orthogonal to the axis of polarization of the radiation reflected by polarizing grating 29 in the first state, and transmit all radiation in the second state. In this implementation, the substrate temperature may be calculated using Equations (13) and (12).

By using a single detector and an optical system, such as a rotatable polarizer or electro-optic cell, which can modify the ratio of reflected radiation to non-reflected radiation impinging the detector, two different intensity measurements are generated at different times by the same detector. This reduces the number of detectors required for the temperature sensor.

Referring to FIG. 5, in another embodiment, partially reflective surface 50 and polarizing filter 62 of temperature sensor 40 are replaced by a single polarizing beam splitter 100. The polarizing beam splitter 100 separates the radiation from light pipe 42 into two beams 102 and 104 having orthogonal polarizations. Specifically, the polarizing beam splitter is oriented so that the radiation reflected by the polarizing grating is excluded from one of the beams, e.g., beam 104. Thus, this beam contains only non-reflected radiation. On the other hand, the other beam, e.g., beam 102, contains both reflected and non-reflected radiation. The two beams 102 and 104 are directed to detectors 58' and 64', which generate a first intensity measurement $I_1$ and a second intensity measurement $I_2$, respectively. The substrate temperature may be calculated from intensity measurements $I_1$ and $I_2$ using Equations (16), (17) and (12).

The three primary techniques discussed above are summarized by the following table.

| Polarizing system excludes | Radiation entering detector includes | Intensity measurements | Intensity calculation |
|---|---|---|---|
| 1st measurement: orthogonal | all reflected, some non-reflected | $I_1 = R + \frac{1}{2}D$ | $I_T = I_1 + I_2$ |
| 2nd measurement: parallel | some non-reflected | $I_2 = \frac{1}{2}D$ | $I_D = 2I_2$ |
| 1st measurement: orthogonal | all reflected, some non-reflected | $I_1 = R + \frac{1}{2}D$ | $I_T = I_2$ |
| 2nd measurement: — | all reflected and all non-reflected | $I_2 = R + D$ | $I_D = 2(I_2 - I_1)$ |
| 1st measurement: — | all reflected and all non-reflected | $I_1 = R + D$ | $I_T = I_1$ |
| 2nd measurement: parallel | some non-reflected | $I_2 = \frac{1}{2}D$ | $I_D = 2I_2$ |

In general, it is possible to obtain emissivity-corrected temperature measurements by applying different polarizations to the radiation from the probe for the two intensity measurements. The equations required to determine the substrate temperature would then be derived from the amount of reflected and non-reflected light reaching the detectors for the two measurements.

The invention is not limited by the embodiments depicted and described. Rather, the scope of the invention is defined by the appended claims.

What is claimed is:

1. An apparatus for measuring the temperature of a substrate in a thermal processing chamber, the chamber including a reflector forming a reflecting cavity with a substrate when the substrate is positioned in the chamber, the apparatus comprising:

a first polarizer positioned to polarize radiation reflected by the reflector;

a probe having an input end positioned to receive radiation from the reflecting cavity, the radiation including reflected radiation emitted by the substrate and reflected by the reflector and non-reflected radiation emitted by the substrate and not reflected by the reflector;

a polarizing system optically coupled to an output end of the probe and configured to generate a first beam and a second beam, the polarizing system including a second polarizer oriented such that a ratio of reflected radiation to non-reflected radiation is higher in the first beam than the second beam; and a detector apparatus optically coupled to the polarizing system to generate a first intensity signal from the first beam and a second intensity signal from the second beam.

2. The apparatus of claim 1, further comprising a processor coupled to the detector apparatus to calculate a substrate temperature from the first and second intensity signals.

3. The apparatus of claim 1, wherein the first polarizer is located on a surface of the reflector.

4. The apparatus of claim 3, wherein the first polarizer comprises a polarizing grating.

5. The apparatus of claim 4, wherein the polarizing grating is a ruled grating.

6. The apparatus of claim 4, wherein the polarizing grating is a holographic grating.

7. The apparatus of claim 1, wherein the first polarizer polarizes the radiation reflected from by the reflector with a first axis of polarization.

8. The apparatus of claim 7, wherein the second polarizer is configured to exclude radiation from the second beam having an axis of polarization parallel to the first axis of polarization.

9. The apparatus of claim 7, wherein the second polarizer is configured to exclude radiation from the first beam having an axis of polarization perpendicular to the first axis of polarization.

10. The apparatus of claim 7, wherein the polarizing system includes a partially reflective surface positioned in an optical path of radiation exiting the output end of the probe to split that radiation into the first and second beams.

11. The apparatus of claim 10, wherein the second polarizer comprises a polarizing filter positioned in an optical path of the first beam and oriented to block radiation having an axis of polarization orthogonal to the first axis of polarization.

12. The apparatus of claim 10, wherein the second polarizer comprises a polarizing filter positioned in an optical path of the second beam and oriented to block radiation having an axis of polarization parallel to the first axis of polarization.

13. The apparatus of claim 7, wherein the second polarizer comprises a polarizing beam splitter positioned in an optical path of radiation exiting the output end of the probe to split that radiation into the first and second beams, the polarizing beam splitter being oriented so that radiation with an axis of polarization parallel to the first axis forms the first beam and radiation with an axis of polarization orthogonal to the first axis of radiation forms the second beam.

14. The apparatus of claim 7, wherein the second polarizer comprises a polarizing filter positioned in an optical path of radiation exiting the output end of the probe, the polarizing filter movable between a first position in which the polarizing filter blocks radiation having an axis of polarization orthogonal to the first axis of polarization to form the first beam and a second position in which the polarizing filter blocks radiation having an axis of polarization parallel to the first axis of polarization to form the second beam.

15. The apparatus of claim 7, wherein the second polarizer comprises an electro-optic polarizing filter positioned in an optical path of radiation exiting the output end of the probe, the polarizing filter switchable between a first state in which the polarizing filter blocks radiation having an axis of polarization that is orthogonal to the first axis of polarization to form the first beam and a second state in which the polarizing filter transmits radiation having an axis of polarization that is orthogonal to the first axis of polarization to form the second beam.

16. The apparatus of claim 7, wherein the second polarizer comprises an electro-optic polarizing filter positioned in an optical path of radiation exiting the output end of the probe, the polarizing filter switchable between a first state in which the filter transmits radiation having an axis of polarization that is parallel to the first axis of polarization to form the first beam and a second state in which the filter blocks radiation having an axis of polarization that is parallel to the first axis of polarization to form the second beam.

17. The apparatus of claim 1, wherein the detector apparatus includes a first detector positioned in an optical path of the first beam to generate the first intensity signal and a second detector positioned in an optical path of the second beam to generate the second intensity signal.

18. An apparatus for measuring the temperature of a substrate in a thermal processing chamber, the chamber including a reflector forming a reflecting cavity with a substrate when the substrate is positioned therein, the apparatus comprising:
- a first polarizer positioned to polarize reflected radiation emitted by the substrate and reflected from the reflector with a first axis of polarization;
- a probe having an input end positioned to sample radiation from the reflecting cavity, the radiation including the reflected radiation and non-reflected radiation emitted by the substrate and not reflected by the reflector;
- a partially reflective surface optically coupled to an output end of the probe to divide the sampled radiation into a first beam and a second beam;
- a first detector to receive the first beam and generate a first intensity signal;
- a second detector to receive the second beam and generate a second intensity signal; and
- a second polarizer positioned in an optical path of the second beam, the second polarizer oriented to block substantially all radiation having an axis of polarization that is one of parallel and orthogonal to the first axis of polarization.

19. An apparatus for measuring the temperature of a substrate in a thermal processing chamber, the chamber including a reflector forming a reflecting cavity with a substrate when the substrate is positioned in the chamber, the apparatus comprising:
- a first polarizer positioned to polarize radiation reflected from the reflector with a first axis of polarization;
- a probe having an input end positioned to sample radiation from the reflecting cavity;
- a second polarizer optically coupled to an output end of the probe, the second polarizer operable in first and second configurations, wherein in the first configuration the polarizer blocks a portion of the radiation having an axis of polarization that is one of parallel and orthogonal to the first axis of polarization, and a second configuration in which it transmits the portion of the radiation; and
- a detector optically coupled to the second polarizer to generate a first intensity signal when the second polarizer is in the first configuration and a second intensity signal when the second polarizer is in the second configuration.

20. The apparatus of claim 19, wherein the second polarizer comprises a polarizing filter which is movable between the first and second configurations.

21. The apparatus of claim 19, wherein the second polarizer comprises an electro-optic polarizing filter which is switchable between the first and second configurations.

22. An apparatus for measuring the temperature of a substrate in a thermal processing chamber, the chamber including a reflector forming a reflecting cavity with a substrate when the substrate is positioned in the chamber, the apparatus comprising:

a first polarizer positioned to polarize reflected radiation emitted by the substrate and reflected from the reflector with a first axis of polarization;

a probe having an input end positioned to sample reflected radiation and non-reflected radiation emitted by the substrate and not reflected by the reflector from the reflecting cavity;

a polarizing beam splitter optically coupled to an output end of the probe to divide the sampled radiation into a first beam containing radiation having an axis of polarization parallel to the first axis of polarization and a second beam having an axis of polarization orthogonal to the first axis of polarization;

a first detector to receive the first beam and generate a first intensity signal; and a second detector to receive the second beam and generate a second intensity signal.

23. An apparatus for measuring the temperature of a substrate in a thermal processing chamber, comprising:

a reflector forming a reflecting cavity with a substrate when the substrate is positioned in the chamber;

a first polarizer positioned to polarize reflected radiation emitted by the substrate and reflected by the reflector;

a probe having an input end positioned to receive reflected radiation and non-reflected radiation emitted by the substrate and not reflected by the reflector from the reflecting cavity;

a polarizing system optically coupled to an output end of the probe and configured to generate a first beam and a second beam, the polarizing system including a second polarizer oriented so that a ratio of reflected radiation to non-reflected radiation is higher in the first beam than the second beam;

a detector optically coupled to the polarizing system to generate a first intensity signal from the first beam and a second intensity signal from the second beam; and a processor coupled to the detector to calculate a substrate temperature from the first and second intensity signals.

24. An apparatus for measuring the temperature of a substrate in a thermal processing chamber, the chamber including a reflector forming a reflecting cavity with a substrate when the substrate is positioned in the chamber, the apparatus comprising:

a probe having an input end positioned to receive reflected and non-reflected radiation from the reflecting cavity;

a detector optically coupled to an output end of the probe to generate first and second intensity signals; and an optical system positioned in an optical path between the probe and the detector, the optical system operable in a first and second configurations, wherein a ratio of reflected radiation to non-reflected radiation impinging the detector is higher in the first configuration than the second configuration.

25. A method of measuring the temperature of a substrate in a thermal processing chamber, comprising:

positioning a substrate in a thermal processing chamber to form a reflecting cavity with a reflector located in the chamber;

polarizing reflected radiation emitted by the substrate and reflected by the reflector with a first polarizer;

sampling the reflected radiation and non-reflected radiation emitted by the substrate and not reflected by the reflector from the cavity with a probe;

directing the sampled radiation through a polarizing system to generate a first beam and a second beam, wherein the polarizing system includes a second polarizer oriented so that a ratio of reflected radiation to non-reflected radiation is higher in the first beam than the second beam;

generating a first intensity signal for the first beam;

generating a second intensity signal for the second beam; and determining a substrate temperature from the first and second intensity signals.

26. A method of measuring the temperature of a substrate in a thermal processing chamber, comprising:

positioning a substrate in a thermal processing chamber to form a reflecting cavity with a reflector located in the chamber;

sampling radiation from the cavity with a probe;

generating a first intensity signal for the sampled radiation with a detector;

modifying the ratio of reflected radiation to non-reflected radiation in the radiation impinging the detector;

generating a second intensity signal for the second beam; and determining a substrate temperature from the first and second intensity signals.

* * * * *